(12) United States Patent
Huber et al.

(10) Patent No.: US 9,143,748 B2
(45) Date of Patent: Sep. 22, 2015

(54) METHOD AND SYSTEM FOR DIFFERENTIAL DISTORTION CORRECTION FOR THREE-DIMENSIONAL (3D) PROJECTION

(75) Inventors: Mark J. Huber, Burbank, CA (US); William Gibbens Redmann, Glendale, CA (US); Jed Harmsen, Los Angeles, CA (US)

(73) Assignee: Thomson Licensing, Issy les Moulineaux (FR)

( * ) Notice: Subject to any disclaimer, the term of this patent is extended or adjusted under 35 U.S.C. 154(b) by 374 days.

(21) Appl. No.: 12/803,657

(22) Filed: Jul. 1, 2010

(65) Prior Publication Data
US 2011/0007278 A1  Jan. 13, 2011

Related U.S. Application Data

(60) Provisional application No. 61/270,094, filed on Jul. 2, 2009, provisional application No. 61/261,259, filed on Nov. 13, 2009.

(51) Int. Cl.
| | |
|---|---|
| G03B 21/14 | (2006.01) |
| G03B 35/00 | (2006.01) |
| G02B 27/22 | (2006.01) |
| H04N 13/04 | (2006.01) |
| H04N 9/31 | (2006.01) |

(Continued)

(52) U.S. Cl.
CPC .............. H04N 9/3185 (2013.01); G02B 27/22 (2013.01); G03B 21/147 (2013.01); G03B 35/18 (2013.01); H04N 13/0044 (2013.01); H04N 13/0425 (2013.01); H04N 13/0459 (2013.01)

(58) Field of Classification Search
CPC ........... H04N 9/3185; H04N 13/0044; H04N 2013/0074; H04N 2013/0465; G02B 27/22; G03B 21/147
USPC ............. 353/7, 10, 69; 352/57; 359/458, 462, 359/466; 348/51, 42
See application file for complete search history.

(56) References Cited

U.S. PATENT DOCUMENTS

| | | | |
|---|---|---|---|
| 4,235,503 A | 11/1980 | Condon | |
| 4,464,028 A | 8/1984 | Condon | |

(Continued)

FOREIGN PATENT DOCUMENTS

| | | |
|---|---|---|
| CN | 1471792 | 1/2004 |
| CN | 101014137 | 8/2007 |

(Continued)

OTHER PUBLICATIONS

Skala, "Cross-Talk Measurement for 3D Displays", IEEE Proceedings ISBN 978-1-4244-4318-5, May 2009, pp. 1-4.

(Continued)

*Primary Examiner* — William C Dowling
*Assistant Examiner* — Magda Cruz
(74) *Attorney, Agent, or Firm* — Robert D. Shedd; Robert B. Levy; Lily Neff

(57) ABSTRACT

A method and system are disclosed for differential distortion correction for use in the three-dimensional (3D) projection of film-based or digital images. A compensation transform determined based on distortion information can be applied to image data to compensate for distortions in stereoscopic images for 3D projection. Different approaches can be used for obtaining the compensation transform.

18 Claims, 7 Drawing Sheets

(51) Int. Cl.
*H04N 13/00* (2006.01)
*G03B 35/18* (2006.01)

(56) References Cited

U.S. PATENT DOCUMENTS

| | | | |
|---|---|---|---|
| 4,999,668 | A | 3/1991 | Suzuki et al. |
| 5,099,359 | A | 3/1992 | Hrycin et al. |
| 5,119,189 | A | 6/1992 | Iwamoto et al. |
| 5,121,983 | A | 6/1992 | Lee |
| 5,255,083 | A | 10/1993 | Capitant et al. |
| 5,481,321 | A | 1/1996 | Lipton |
| 5,808,623 | A | 9/1998 | Hamburg |
| 6,002,518 | A | 12/1999 | Faris |
| 6,011,863 | A | 1/2000 | Roy |
| 6,191,827 | B1 | 2/2001 | Segman et al. |
| 6,361,171 | B1 | 3/2002 | Ejiri et al. |
| 6,367,933 | B1 | 4/2002 | Chen et al. |
| 6,433,840 | B1 | 8/2002 | Poppleton |
| 6,491,400 | B1 | 12/2002 | Chen et al. |
| 6,523,959 | B2 | 2/2003 | Lee et al. |
| 6,530,665 | B2 | 3/2003 | Takizawa et al. |
| 6,592,224 | B2 | 7/2003 | Ito et al. |
| 6,609,797 | B2 | 8/2003 | Ejiri et al. |
| 6,753,907 | B1 | 6/2004 | Sukthankar et al. |
| 6,801,276 | B1 | 10/2004 | Epstein et al. |
| 6,804,392 | B1 | 10/2004 | Adams et al. |
| 6,804,406 | B1 | 10/2004 | Chen |
| 6,932,479 | B2 | 8/2005 | Kobayashi et al. |
| 6,939,011 | B2 | 9/2005 | Kobayashi |
| 6,974,217 | B2 | 12/2005 | Kimura et al. |
| 6,977,693 | B2 | 12/2005 | Aronovitz |
| 6,997,563 | B1 | 2/2006 | Wang et al. |
| 7,001,023 | B2 | 2/2006 | Lee et al. |
| 7,014,323 | B2 | 3/2006 | Kobayashi et al. |
| 7,073,911 | B2 | 7/2006 | Yanagisawa |
| 7,140,736 | B2 | 11/2006 | Kobayashi |
| 7,142,258 | B2 | 11/2006 | Shin et al. |
| 7,144,115 | B2 | 12/2006 | Li |
| 7,148,945 | B2 | 12/2006 | Yanagisawa |
| 7,517,081 | B2 | 4/2009 | Lipton et al. |
| 7,524,053 | B2 | 4/2009 | Lipton |
| 7,944,481 | B2 | 5/2011 | Kim et al. |
| 7,945,088 | B2 | 5/2011 | Era |
| 8,144,188 | B2 | 3/2012 | Facius et al. |
| 2001/0024231 | A1 | 9/2001 | Nakamura et al. |
| 2002/0036819 | A1 | 3/2002 | Watanabe |
| 2002/0122585 | A1 | 9/2002 | Swift et al. |
| 2002/0135741 | A1 | 9/2002 | Lee et al. |
| 2003/0043303 | A1 | 3/2003 | Karuta et al. |
| 2003/0086051 | A1 | 5/2003 | Chou et al. |
| 2004/0246390 | A1 | 12/2004 | Yanagisawa |
| 2006/0181686 | A1* | 8/2006 | Matsuda ............ 353/69 |
| 2006/0268104 | A1 | 11/2006 | Cowan et al. |
| 2006/0291050 | A1 | 12/2006 | Shestak et al. |
| 2007/0126986 | A1 | 6/2007 | Yamazaki et al. |
| 2008/0204663 | A1 | 8/2008 | Balogh |
| 2008/0309884 | A1 | 12/2008 | O'Dor et al. |
| 2009/0128780 | A1* | 5/2009 | Schuck et al. ............ 353/20 |
| 2009/0135365 | A1 | 5/2009 | Dunn |
| 2009/0153649 | A1* | 6/2009 | Hirooka et al. ............ 348/47 |
| 2009/0167639 | A1* | 7/2009 | Casner et al. ............ 345/58 |
| 2011/0032340 | A1 | 2/2011 | Redmann et al. |
| 2011/0038042 | A1 | 2/2011 | Redmann et al. |
| 2011/0080401 | A1* | 4/2011 | Tan et al. ............ 345/419 |

FOREIGN PATENT DOCUMENTS

| | | |
|---|---|---|
| CN | 101015220 | 8/2007 |
| CN | 101424863 | 5/2009 |
| GB | 835705 | 5/1960 |
| JP | 4347994 | 12/1992 |
| JP | 2001054142 | 2/2001 |
| JP | 2001-339742 | 12/2001 |
| JP | 200361116 | 2/2003 |
| JP | 2005-130360 | 5/2005 |
| JP | 2006094458 | 4/2006 |
| JP | 2006-133252 | 5/2006 |
| JP | 2007534984 | 11/2007 |
| JP | 2008539675 | 11/2008 |
| WO | WO2006116536 | 11/2006 |
| WO | WO2009150529 | 12/2009 |

OTHER PUBLICATIONS

Boev et al., "Crosstalk Measurement Methodology for Auto-Stereoscopic Screens", Tampere university of Technology, Finland, Feb. 2007. pp. 1-4.

Kodak, "Kodak Telecine Tool Kit and Reference Manual", Kodak, Mar. 2003, pp. 1-40.

Huang et al., "Measurement of Contrast Ratios for 3D Display", Input/Output and Imaging Technologies II, Taiwan, Jul. 2000, pp. 78-86. Proceedings of SPIE vol. 4080.

Lacotte et al.: "Elimination of Keystone and Crosstalk Effects in Stereoscopic Video" Rapport Technique De L'Inrs-Telecommunications, No. 95-31, Dec. 22, 1995, pp. 1-27.

Li et al.: "Multi-Projector Tiled Display Wall Calibration with a Camera", Proceedings SPIE-IS&T Electronic Imaging, SPIE vol. 5668, p. 294-301, 2005.

Office Actions for U.S. Appl. No. 12/846,676 mailed Nov. 28, 2012, Sep. 9, 2013.

Office Actions for U.S. Appl. No. 12/806,445 mailed Aug. 14, 2012, May 17, 2013, Sep. 16, 2013.

Woods, "Understanding Crosstalk in Stereoscopic Displays", Keynote presentation at 3DSA (Three-Dimensional Systems and Applications) conference, Tokyo, Japan May 19-21, 2010.

Woods, "How are Crosstalk and Ghostling Defined in the Stereoscopic Literature?", Proceedings of SPIE Stereoscopic Displays and Applications XXII. vol. 7863, 2011.

Konrad et al., "Cancellation of Image Crosstalk in Time-Sequential Displays of Stereoscopic Video", IEEE Transactions on Image Processing, vol. 9, No. 5, May 2000.

Office Action for U.S. Appl. No. 12/846,676 mailed Apr. 3, 2014.

Notice of Allowance, U.S. Appl. No. 12/806,445, dated Jan. 7, 2015.

Office Action, U.S. Appl. No. 12/846,676 mailed Mar. 20, 2015.

* cited by examiner

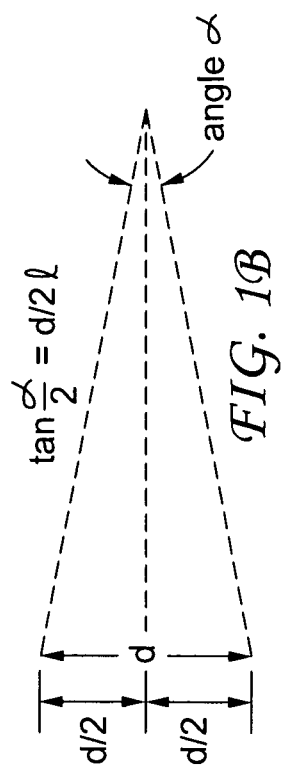
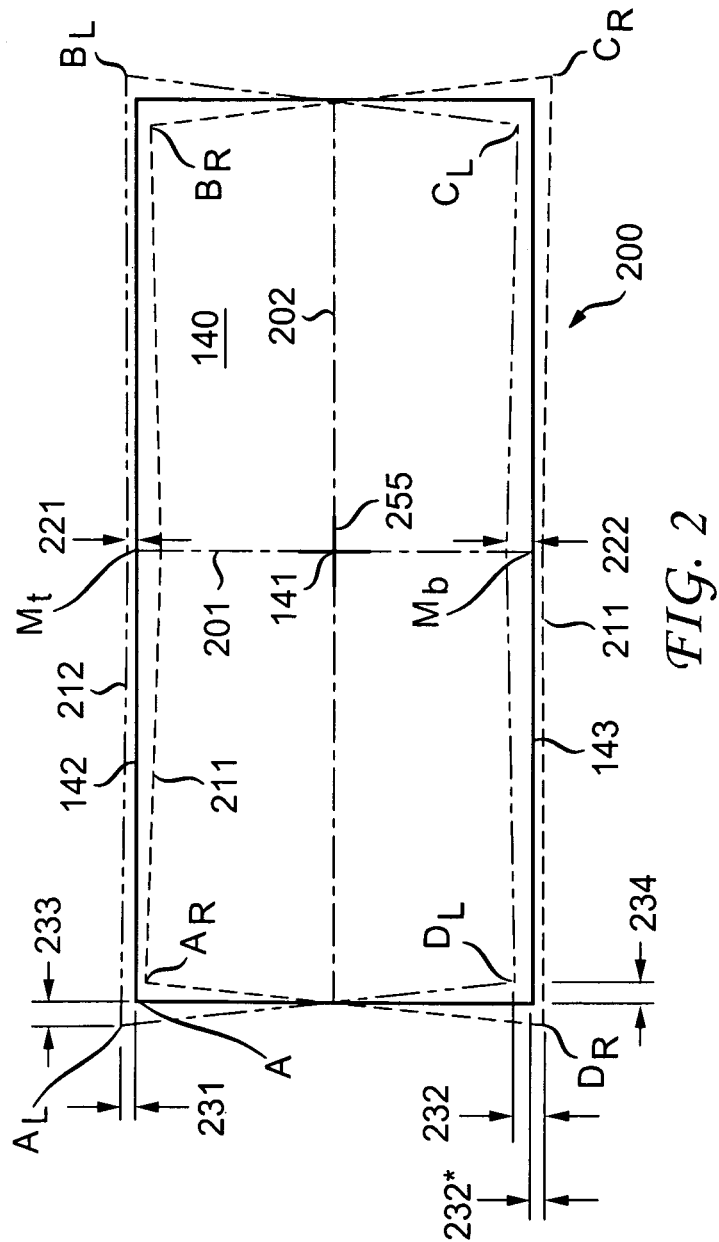

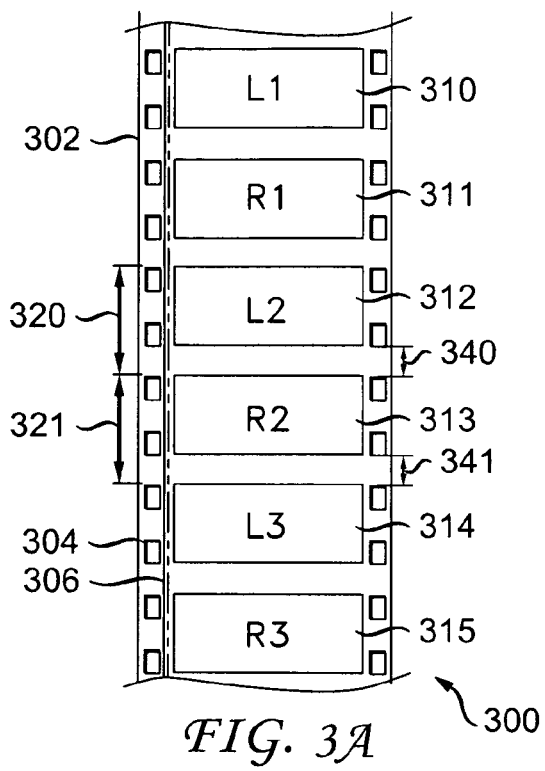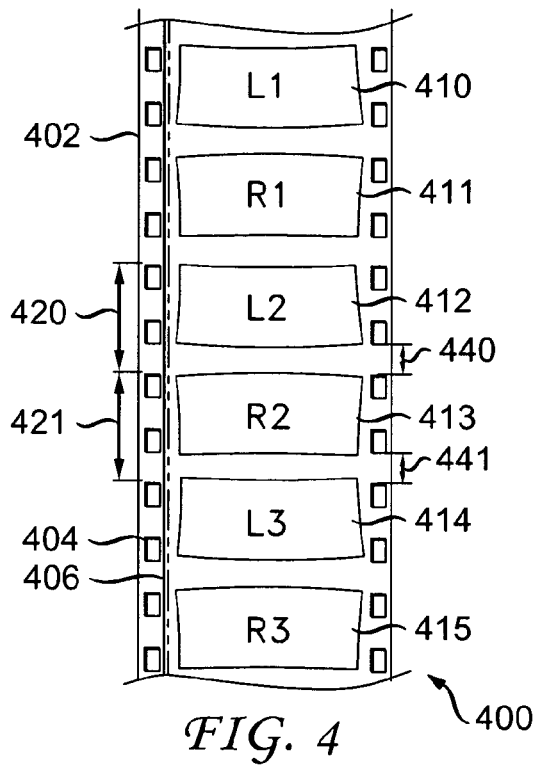
FIG. 3A
FIG. 4
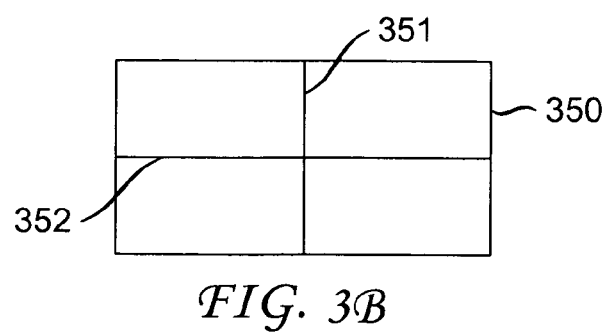
FIG. 3B

METHOD AND SYSTEM FOR DIFFERENTIAL DISTORTION CORRECTION FOR THREE-DIMENSIONAL (3D) PROJECTION

CROSS-REFERENCE TO RELATED APPLICATIONS

This application claims priority to U.S. Provisional application Ser. No. 61/270,094, "Differential Distortion Correction for Dual-Lens 3D Projection" filed on Jul. 2, 2009, and U.S. Provisional application Ser. No. 61/261,259, "Differential Distortion Correction for Dual-Lens Three-Dimensional (3D) Projection" filed on Nov. 13, 2009, both of which are herein incorporated by reference in their entirety.

TECHNICAL FIELD

The present invention relates to a method and system for differential distortion correction for use in three-dimensional (3D) projection:

BACKGROUND

The current wave of 3-dimensional (3D) movies is gaining popularity and made possible by the ease of use of 3D digital cinema projection systems. However, the rate of rollout of those systems is not adequate to keep up with demand, and is further a very expensive approach to obtaining 3D. Earlier 3D film-based systems were besieged by difficulties, including mis-configuration, low brightness, and discoloration of the picture, but are considerably less expensive than the digital cinema approach. In the 1980's, a wave of 3D films were shown in the US and elsewhere, making use of a lens and filter designed and patented by Chris Condon (U.S. Pat. No. 4,464,028). Other improvements to Condon were proposed, such as by Lipton in U.S. Pat. No. 5,481,321. Subject matter in both references are herein incorporated by reference in their entirety.

One lens configuration, the "over and under" lenses or "dual-lens" arrangement (e.g., an upper lens for projecting an image for one eye, and a lower lens for projecting an image for the other eye) project the corresponding left- and right-eye images with a differential keystone distortion. This arises because the upper lens (typically corresponding to the right-eye image, for example), is higher above the bottom of the screen than is the lower lens (e.g., corresponding to the left-eye image), and thus, has a greater distance to the bottom of the screen, resulting in the right-eye image undergoing greater magnification there than the left-eye image. Similarly, the left-eye image (through the lower lens) undergoes greater magnification at the top of the screen than does the right-eye image. These different magnifications can result in detrimental effects such as different depth perceptions at different portions of the projection screen, or mis-alignments between left- and right-eye images causing fatigue for the viewers.

Since this dual-lens configuration is used in many film-based and some digital projection systems, the presence of distortions such as keystoning can adversely affect many 3D film or digital presentations. In general, projection systems that have non-identical projection geometries for the respective left- and right-eye images are susceptible to this distortion (e.g., digital projection systems using time-domain multiplexing of the imagers to project left- and right-eye images from the same physical imagers with identical geometries do not suffer from keystone distortions).

While distortion compensation can benefit both film-based and digital presentations, for film-based systems, it is further desirable to improve the 3D presentation quality by improving the image separation, color, and brightness so as to compete with digital cinema presentations.

BRIEF DESCRIPTION OF THE DRAWINGS

The teachings of the present invention can be readily understood by considering the following detailed description in conjunction with the accompanying drawings, in which:

FIG. 1b illustrates a relationship for some parameters of the projection system of FIG. 1a;

FIG. 2 illustrates the differential distortions to left- and right-eye images projected with a dual-lens projection system similar to that of FIG. 1a;

FIG. 3a illustrates a segment of a 3D film suitable for use in the projection system of FIG. 1a;

FIG. 3b illustrates a test image pattern in a calibration film or digital image;

FIG. 4 illustrates a segment of a distortion corrected 3D film of the present invention, suitable for use in the projection system of FIG. 1a, but without producing the differential distortions shown in FIG. 2;

To facilitate understanding, identical reference numerals have been used, where possible, to designate identical elements that are common to the figures. The drawings are not to scale, and one or more features may be expanded or reduced for clarity.

SUMMARY OF THE INVENTION

Figure 1A:
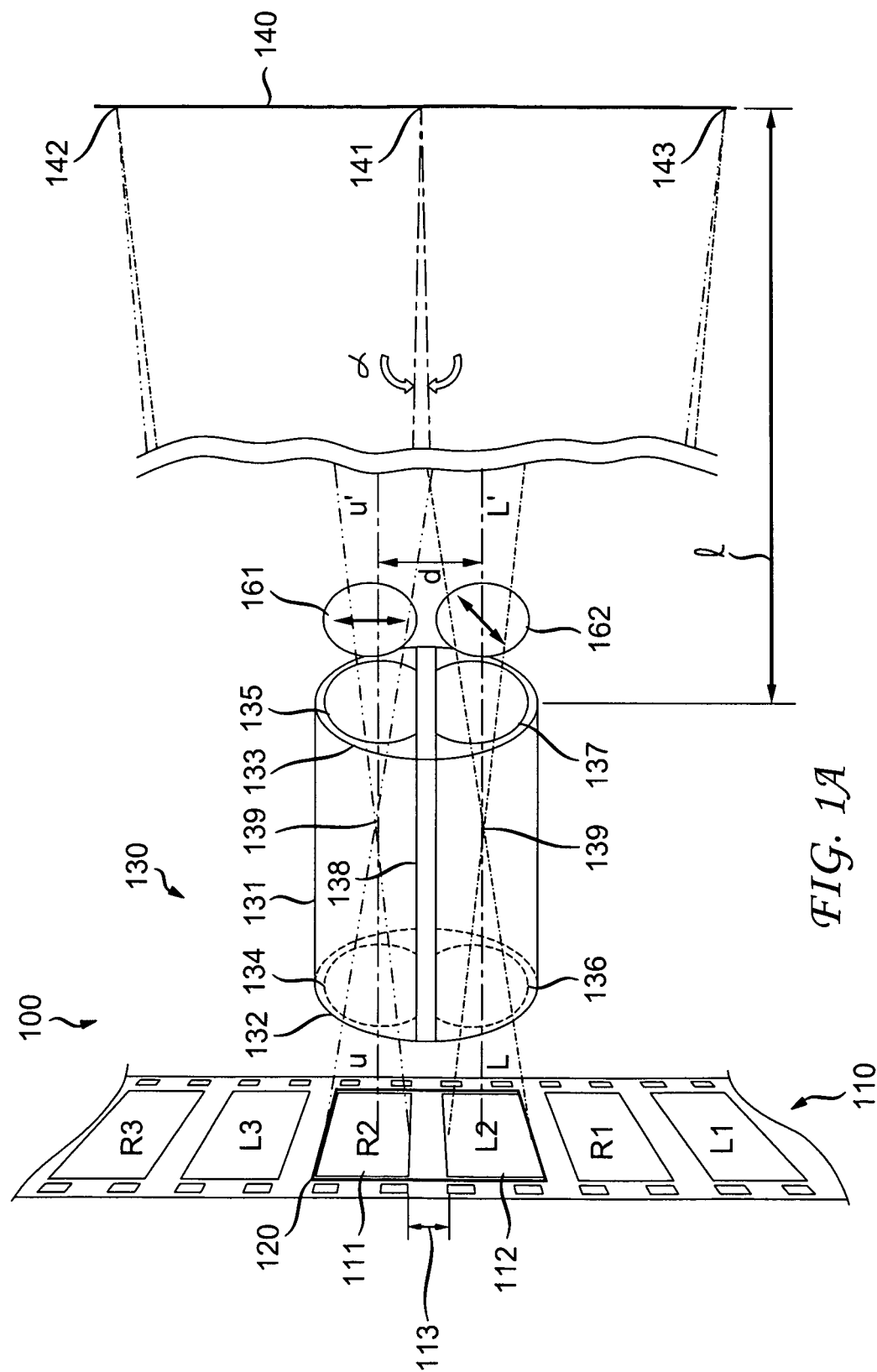
FIG. 1a illustrates a stereoscopic film projection system using a dual lens.

Embodiments of the present principles provide a method, system and images for use in 3D presentations. The method provides a transform that can be used to at least partially compensate for differential distortions between two images of a stereoscopic pair, the differential distortions being associated with various parameters of a projection system. By applying the compensation transform to at least one of the images of a stereoscopic pair, differential distortions between the two images can be reduced or eliminated.

In one embodiment, a method for use in three-dimensional (3D) projection includes: (a) providing a transform for compensating for at least a portion of a differential distortion between a first image and a second image of a stereoscopic pair for 3D projection, and (b) applying the compensation transform to at least the first image for reducing the differential distortion with respect to the second image.

Another embodiment provides a plurality of images for projection in a three-dimensional (3D) projection system, which include: a first set of images and a second set of images, each image from the first set of images forming a stereoscopic image pair with an associated image from the second set of images, and at least one of the first set and the second set of images includes image data that has been transformed for at least partially compensating for differential distortion between respective images of any stereoscopic image pair, said differential distortion being associated with the projection system.

Another embodiment provides a system that includes a projector for projecting three-dimensional (3D) images, and at least one processor configured for providing a compensation transform, and applying the compensation transform to images for 3D projection.

Another embodiment provides a computer readable medium having stored instructions that, when executed by a processor, will perform a method that includes the steps of: (a) providing a transform for compensating for at least a portion of a differential distortion between a first image and a second image of a stereoscopic pair for 3D projection, and (b) applying the compensation transform to at least the first image for reducing the differential distortion with respect to the second image.

DETAILED DESCRIPTION

Prior single-projector 3D film systems use a dual lens to simultaneously project left- and right-eye images laid out above and below each other on the same strip of film. These "over-and-under" 3D projection systems exhibit a differential keystoning effect (i.e., different keystone distortions for the left- and right-eye images) since the upper and lower lenses do not have a common optical axis.

In one embodiment of the present invention, the amount of differential keystoning is measured, calculated, or estimated, and a correction is made for the corresponding amount of keystoning distortion from each of the left- and right-eye images (the left- and right-eye images for a specific frame or scene is often referred to as a "stereoscopic image pair"). Corrections to other types of distortions such as pin cushion, barrel distortions, if present, may also be provided based on corresponding measurements.

Existing projection systems include a single, standard, 2D film projector having a dual lens configuration to project each of two images at the same time (one for the left eye, one for the right eye) and a filter inline with each of the left- and right-eye halves (typically the bottom and top, respectively) of the dual lens encodes the corresponding left- and right-eye images of a stereoscopic pair so that when projected on a screen, an audience wearing glasses with filters corresponding to those of the dual lens system and properly oriented, will perceive the left-eye image in their left eyes, and the right-eye image in their right eyes. This is discussed below as background to facilitate the description of the present invention.

Referring to FIG. 1, an over/under lens 3D film projection system 100 is shown, also called a dual-lens 3D film projection system. Rectangular left-eye image 112 and rectangular right-eye image 111 (separated by an intra-frame gap 113), both on over/under 3D film 110, are simultaneously illuminated by a light source and condenser optics behind the film (not shown here) while framed by aperture plate 120 (of which only the inner edge of the aperture is illustrated, for clarity) such that all other images on film 110 are not visible as they are covered by the portion of the aperture plate which is opaque. The images visible through aperture plate 120 are projected by over/under lens system 130 onto screen 140, generally aligned and superimposed.

Over/under lens system 130 (also called a dual-lens system) comprises body 131, entrance end 132, and exit end 133. The upper and lower halves of lens system 130 are separated by septum 138 which prevents stray light from crossing between halves. The upper half, typically associated with right-eye images (such as 111) has entrance lens 134 and exit lens 135. The lower half, typically associated with left-eye images (such as 112) has entrance lens 136 and exit lens 137. Other lens elements and aperture stops internal to each half of dual lens system 130 are not shown, again for clarity. Additional lens elements, for example a magnifier following the exit end of dual lens 130, may also be added when appropriate to the proper adjustment of the projection system 100, but are also not shown.

Projection screen 140 has viewing area center point 141 at which the projected images of the two film images 111 and 112 should be centered. Ideally, the top of both projected images is aligned at the top of the screen viewing area 142, and the bottom of the projected images is aligned at the bottom of the screen viewing area 143.

The distance between the optical axes UU' and LL' of the upper and lower halves of lens system 130 substantially equals inter-lens distance d. The distance from the exit end 133 to the screen 140 substantially equals throw distance l (or, to be unnecessarily exact, the throw l may be measured from either exit pupil of lens system 130 to the screen 140, and inter-lens distance d is the apparent distance between the centers of exit pupils of lens system 130). The prime rays from the center of each of film images 111 and 112 pass through the center of the aperture stop 139 of the corresponding half of dual lens 130 separated by inter-lens distance d and (when properly aligned) substantially converge at center point 141 of the screen viewing area. Note that the prime rays (or their optical paths) from the respective centers of the left- and right-eye images do not necessarily coincide with the optical axes UU', LL' of the respective lens assembly, for instance where the optical axes UU', LL' are parallel and not converging with angle α. As illustrated in FIG. 1(b), the convergence angle α is equal to twice the arc-tangent of the ratio of half of inter-lens distance d to the throw l (which for most single-projector dual-lens projection configurations is substantially equal to the arc-tangent of the ratio of inter-lens distance d to throw l).

Shown in FIG. 1a are right-eye and left-eye specific filters or shutters 161 and 163, typically mounted on or near dual lens 130, e.g., after exit lenses 135 and 137, respectively, to encode the projected right- and left-eye images so that corresponding filters or shutters on an appropriate pair of glasses worn by each member of the audience ensure that the left-eye images are only viewed by the audience's left eyes and the right-eye images are only viewed by the audience's right eyes (as least as long as they are wearing the glasses). Various such filters for this purpose, including linear polarizers, anaglyphic (red and blue), interlaced interference comb filters, are all well-known. Active shutter glasses, for example using LCD shutters to alternate between blocking the left or right eye in synchrony with a like-timed shutter operating to extinguish the projection of the corresponding film image are also feasible. An apparatus incorporating circular polarizers for use in projecting stereoscopic images for 3D presentation is described in a commonly-owned PCT patent application (PCT/US09/006,557), by Huber et al., "Improved Over-Under Lens for Three-Dimensional Projection" filed on Dec. 15, 2009.

In one example, filter 161 is an absorbing linear polarizer having vertical orientation, and filter 162 is an absorbing linear polarizer having horizontal orientation. Screen 140 would be a polarization preserving projection screen, e.g., a silver screen. Thus, the right-eye image 111 projected through the top half of dual lens 130 has vertical polarization and the left-eye image 112 projected through the bottom half of dual lens 130 has horizontal polarization, both of which are preserved as the projected images are reflected by screen 140.

Audience members wearing glasses (not shown) with a right-eye linear polarizer having vertical axis of polarization and a left-eye linear polarizer having a horizontal axis of polarization will see the projected right-eye image 111 in their right eyes, and the projected left-eye image 112 in their left eyes.

FIG. 2 shows the presence of differential distortion in a projected presentation 200 of a stereoscopic image pair on the viewing portion of projection screen 140 with center point 141. Differential distortion, i.e., different distortions for the projected right- and left-eye images, if present and not corrected or, would result in the same feature in the right-eye and left-eye images appearing at different locations on the screen. Although the differential distortion manifests itself as distortions in the projected images, it is a characteristic of the projection system configuration, e.g., arising from non-asymmetrical or non-identical projection geometries for the right- and left-eye images.

Projected presentation 200 has vertical centerline 201 and horizontal centerline 202 that intersect each other substantially at the screen's center point 141. The projected right-eye image is represented by a slightly distorted (e.g., may have curved sides due to pin cushion and/or barrel distortions) quadrilateral with boundary 211 and corners $A_R$, $B_R$, $C_R$ and $D_R$, and the left-eye image is represented by a slightly distorted quadrilateral with boundary 212 and corners $A_L$, $B_L$, $C_L$ and $D_L$.

The right-eye image boundary 211 and left-eye image boundary 212 are illustrative of a system alignment in which differential keystone distortions of the projected stereoscopic images are horizontally symmetrical about vertical centerline 201 and the differential keystone distortions of the left-eye are vertically symmetrical with those of the right-eye about horizontal centerline 202. The keystoning distortions result primarily because right-eye image 111 is projected by the top half of dual lens 130, which is located further away from the bottom edge 143 of the viewing area (or projected image area) than the lower half of dual lens 130. The slightly increased distance for the top half of lens 130 to the screen compared with the lower half of lens 130 results in a slight increase in magnification for the projected right-eye image compared to the left-eye image, as evident by a longer bottom edge $D_RC_R$ of projected right-eye image 211 compared to the bottom edge $D_LC_L$ of the projected left-eye image 212. On the other hand, the top half of dual lens 130 is closer to the top edge 142 of the viewing area than the lower half of lens 130. Thus, the top edge $A_RB_R$ of projected right-eye image 211 is shorter than the top edge $A_LB_L$ of the projected left-eye image 212.

Near the top-left corner of screen 140, left-eye projected image boundary 212 has horizontal magnification keystone error 233 (representing horizontal distance between corner $A_L$ and corner A, which is where $A_L$ would be in the absence of keystone distortion) vertical magnification keystone error 231. When symmetrically aligned, similar errors are found at the top-right corner of screen 140. Near the bottom-left corner of screen 140, left-eye projected image boundary 212 has horizontal demagnification keystone error 234, and vertical demagnification keystone error 232.

Additionally, a less significant projection error can be caused by field curvature in the dual lens 130. For example, field curvature of the projection lens can cause a pin cushion or barrel distortion that may result in a curvature of the top or bottom edge of the projected image boundaries. Such curvatures are shown in FIG. 2 for the top edge $A_LB_L$ and bottom edge $D_LC_L$ of the left-eye projected image. For example, the vertical distance 221 between the middle ($M_t$) of top edge $A_LB_L$ and the top edge 142 of the viewing area is smaller than the vertical distance 231 between corner $A_L$ and the top edge 142 of the viewing area, and the vertical separation 222 between the middle ($M_b$) of bottom edge $D_LC_L$ and the bottom edge 143 of the viewing area is greater than the vertical separation 232 between the corner $D_L$ and the bottom edge 143.

Such field curvature induced pin cushion or barrel distortion can be corrected by the present invention, e.g., substantially identical corrections can be used for both left- and right-eye images if there is no appreciable difference between the pin cushion distortions for the two images, or if there is appreciable difference between the distortions for the two images, different corrections can be used. In other embodiments, corrections for differential pin cushion and/or barrel distortions may be omitted, e.g., if it is decided that these differential distortions are negligible or can be ignored.

FIG. 3a shows an over/under 3D film 300, e.g., an original film without corrections for geometric distortions from projection systems. Film stock 302 has sprocket holes 304 along both edges, and optical sound track 306 (which may be digital). Regularly spaced along film 302 are respective stereoscopic image pairs, such as first pair of left- and right-eye images 310 and 311, second pair 312 and 313; and third pair 314 and 315, and so on.

FIG. 4 shows one embodiment of the present invention, in which modified left- and right-eye images 410-415 are provided in distortion-corrected over/under 3D film 400. Film stock 402 has sprocket holes 404 and sound track 406 similar to those on 3D film 300. Modified images 410-415 are arranged along film 402, in correspondence to the arrangement of unmodified images 310-315 in 3D film 300.

The original images 310-315 are arranged to have a constant intra-frame gap 340, i.e., the distance between the left- and right-eye images in a pair is the same for each pair. They also have a constant inter-frame gap 341, i.e., the distance between the right-eye image of one stereoscopic pair and the left-eye image of an adjacent pair is the same as between all adjacent pairs. Accordingly, the distance 320 between the tops of images in a pair is the same for all pairs, as is the distance 321 between the tops of adjacent images in adjacent pairs. The sum of distance 320 and 321 is the frame length, and is typically the same for a given projector whether projecting in 2D or 3D, and in this example corresponds to four perforations (also known as 4-perf) of standard 35 mm film.

In the example of FIG. 4, each left- and right-eye image of 3D film 400 has been warped so as to substantially correct or at least partially compensate for the differential keystone errors and field curvature induced distortions shown in FIG. 2. If differential distortion is completely corrected, the left- and right-eye images at the display screen will coincide and have zero disparity. A discussion of computational methods suitable to achieving such a warp is taught by George Wolberg in "Digital Image Warping", published by the IEEE Computer Society Press, Los Alamitos, Calif. 1990. For simple warps to correct keystoning only, the algorithm taught by Hamburg in U.S. Pat. No. 5,808,623 may be used. Subject matter in both references are herein incorporated by reference in their entireties.

As a result of the warping that produces images 410-415, the intra-frame distance 440 may not equal intra-frame distance 340. Similarly, inter-frame distance 441 may not equal inter-frame distance 341. Likewise, the distance 420 between the tops of images in a pair may not equal corresponding distance 320; and the distance 421 between the tops of adjacent images in adjacent pairs may not equal corresponding distance 321. However, the sum of distances 420 and 421 is the frame length and is the same as the sum of distances 320 and 321, thus allowing a direct replacement of distortion corrected 3D film 400 for prior art 3D film 300. In general, distance 420 may be the same as or different from distance 421, and distance 440 may be the same as or different from distance 441.

As shown by Wolberg, the warping of images 310-315 to produce warped images 410-415 can be achieved by many different algorithms. Perhaps the easiest is a perspective warp that employs empirical measurements of the distortions as shown in FIG. 2 and discussed in one branch of the flowchart of FIG. 5.

Figure 5:
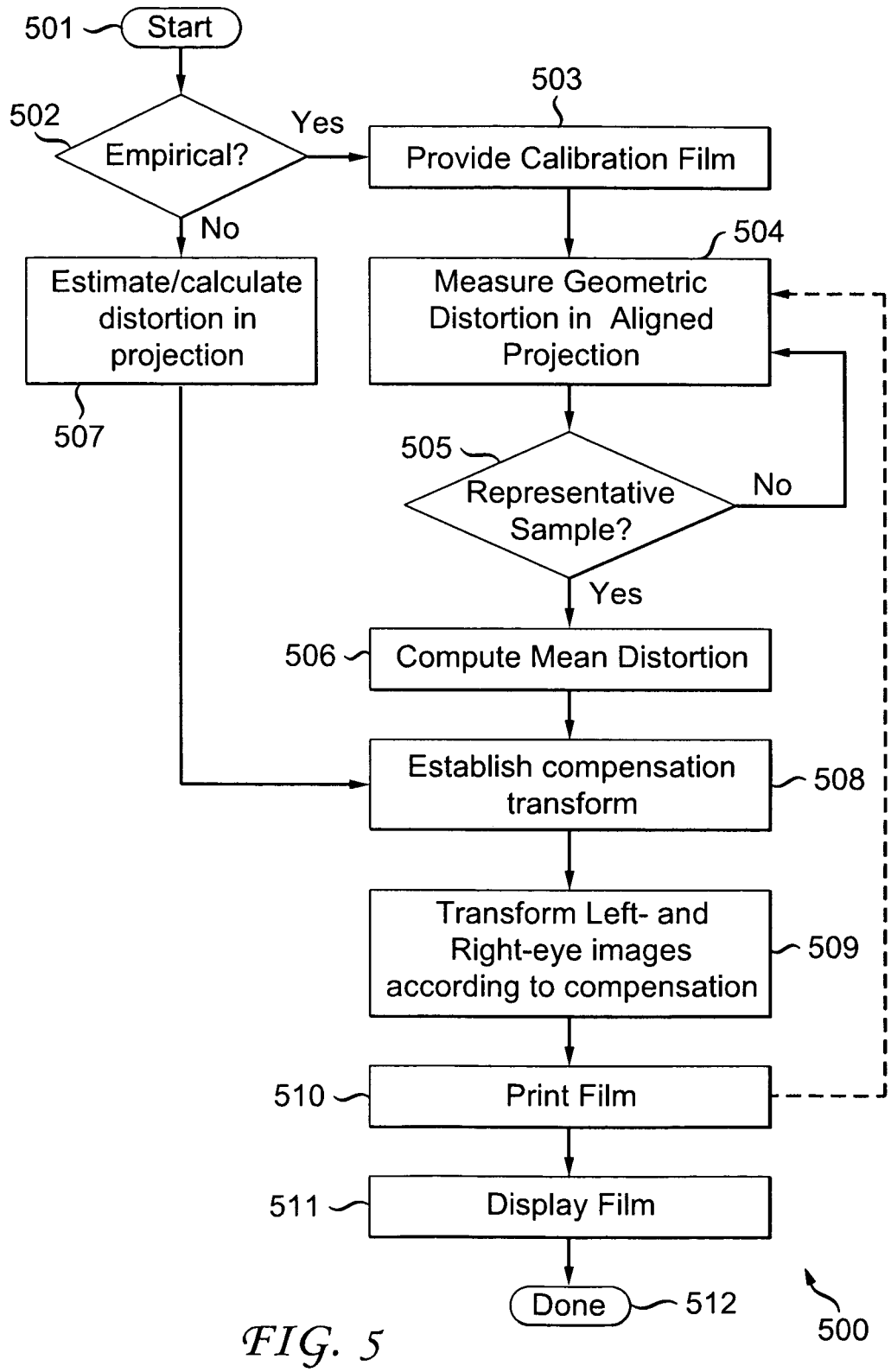
FIG. 5 is a flowchart for one embodiment of a process to create the distortion corrected 3D film of FIG. 4.

FIG. 5 shows a process 500 suitable for stereoscopic distortion correction according to one embodiment of the present principles, which can be used to produce a distortion-corrected film, e.g., film 400. Process 500 begins at step 501 in which the film format (e.g., aspect ratio, image size, etc.) are established. In step 502, a decision is made as to whether the differential keystone and/or field curvature distortions are to be corrected using empirical approaches (e.g., by direct measurements), or by theoretical computations or estimates.

If theoretical computation is selected, then method 500 proceeds to step 507 for the calculation of distortion(s) in the projected images. The calculation will take into account various parameters of the projection system. For example, a shorter throw 1 (and thus, a larger convergence angle α) will result in a larger differential distortion compared with a configuration with a larger throw 1. Based on the calculated or estimated distortion(s), one or more corrections may be derived, and a compensation transform (or correction factor or function) can be established in step 508.

For a dual-lens projection system, e.g., an over/under lens, or a lens arrangement with non-identical projection geometries for the stereoscopic image pair, there are almost always some differential distortions. Thus, it is generally preferable to apply at least some corrections, even if relatively small, than not applying any correction at all. For example, a correction of 1 pixel, or about 0.001 inch or smaller, may be used. The compensation transform in step 508 will be further discussed in a later section.

If an empirical method is selected in step 502, then a calibration or test film is produced (or otherwise made available or provided) in step 503, which will be used in subsequent steps for characterizing one or more distortions and for producing distortion-corrected films. In one example, the calibration film resembles uncorrected 3D film 300, with image aspect ratios and size appropriate to the film format established or selected in step 501. For example, the calibration film may be provided as a loop of film having a number of left- and right-eye images, similar to those shown in the uncorrected film 300. Some or all of the left-images may be the same (e.g., L1 being the same as L2 and/or L3) and one or more of the right-images may be the same (e.g., R1 being the same as R2 and/or R3).

In one embodiment, each left- and right-eye image for the calibration film includes a test pattern, e.g., a rectangular border similar to the edge or rectangular border of each left- and right-eye image 310-315 of FIG. 3a. One example of a test pattern 350 is shown in FIG. 3b. The borders of test pattern 350 may have dimensions that are the same as or close to those of the rectangular borders of images in FIG. 3a. By providing the test pattern 350 to be smaller than images on film 300 (e.g., each border of pattern 350 lying inside images L1, R1, . . . ), one can avoid the border being cut off by aperture plate 120 of FIG. 1. Furthermore, each calibration image or test pattern can have horizontal and vertical centerlines 351 and 352, respectively, as shown in FIG. 3b. Alternatively, instead of the centerlines spanning the entire lengths of the image, a cross-hair may be provided at the center of the image (as an example, a cross-hair projection 255 is shown in FIG. 2).

With 3D projection system 100 properly and symmetrically aligned, this embodiment of the calibration film will produce projected left- and right-eye images similar to those shown in FIG. 2, where the rectangle corresponding to the edge of the left-eye image 312 will produce keystoned boundary 212, and the rectangle corresponding to the edge of the right-eye image 313 will produce the keystoned boundary 211. The vertical and horizontal centerlines (or cross-hair) of the test pattern or calibration image will produce projected vertical and horizontal centerlines that coincide with the centerlines 201 and 202 of the viewing area, respectively.

In step 504, with the 3D projection system 100 aligned for normal operation, the calibration film provided in step 503 is projected. In addition, one or more of the keystoning, pin cushion or barrel distortions (generally referred to as geometric distortions) can be measured from the projected images. Note that for every point on the screen, there are two distortions: one for the left-eye image, and one for the right-eye image. In general, more than one type of distortions may exist in the projected images. However, one can still perform measurements or obtain information directed towards a specific type of distortion by selecting appropriate measurement locations such as corners or edges of a projected image that are relevant to the distortion of interest. Although keystoning distortion is used to illustrate the method of the present principles, it is understood that the measurement and compensation procedures also apply to other types of distortion.

In the above-described embodiment, if borders of the test pattern have a known physical or logical width, e.g., if the lines forming the rectangles are known to be 0.001 inches (physical) or in a digital film recorder the lines are known to be one-pixel wide (logical), then the keystone errors or distortions 231-234 may be measured in line-widths and then converted to these physical or logical units. For example, if the horizontal magnification error 233 appears to be about three line widths, then the value of offset 233 can be noted as 0.003 inches (or three pixels) by relying upon the known width of the lines forming border 212. Another measure of the differential keystone error would be the horizontal distance between the top-left corner ($A_L$) of left-eye image border 212 and the top-left corner ($A_R$) of right-eye image border 211, which, in a symmetrical setup, would equal the sum of distance 233 and distance 234.

In general, the "differential keystone error" can be defined as a difference between the locations of two points in the projected right- and left-images (of a stereoscopic pair), respectively, which, in the absence of keystoning effects in both images, would have appeared at the same location on the screen.

Such empirical measurements can be made for each corner of the respective left- and right-eye images, regardless of whether the projection geometry is symmetrical or not (i.e., if the right- and left-eye images have different magnitudes of various distortions). Furthermore, the pin cushion or barrel distortions can be measured, e.g., by comparing distances 221, 222 with distances 231, 232, which are indicative of curvatures in the top edges of projected left-eye border 212. Similar measurements can also be made for other edges, e.g., $A_L D_L$ or $B_L C_L$, that may exhibit such distortions.

In the above embodiment, measurements are performed at separate corner and edge points for each of the left- and right-eye images (an edge point refers to a point along an edge of a projected image where measurement can be performed, e.g., distance 221 is one measurement taken at an edge point).

However, for each point where distortion measurement is done for the left-eye image, the right-eye image is likely to have a corresponding distortion. In an alternative embodiment, each left- and right-eye calibration image includes a graduated grid (not shown), which acts as a coordinate system for the screen. At selected points on the screen 140, coordinates can be taken from each of the projected left- and right-eye grids. The reading of these coordinates can be aided by the left-eye grid being in one color (e.g., green) and the right-eye grid being in another color (e.g., red). Alternatively, the left- and right-eye grids can be projected separately, for example, by covering exit lens 135 while making measurements for the left-eye, and covering exit lens 137 while measuring the right-eye image. Using a graduated grid can provide an advantage if screen 140 is non-planar, e.g., a cylindrical screen, or toroidal screen, where differential distortions may not be adequately defined by measurements only at corner or edge points of the projected image. In general, any frame in a film with a variety of image patterns can be used as calibration film, as long as the pattern includes discernible reference points or edges to allow measurement of the specific distortion of interest.

When measurements in step 504 are complete, an evaluation is made in step 505 as to whether the measurements constitute a representative sample. If, for example, a distortion-corrected film 400 is being made for only one theatre which is where distortion measurements were performed in step 504, then the measurements may be used exactly as noted. If, however, the measurements made in one theatre or display venue (i.e., one projection system and configuration) are used for a distortion-corrected film 400 to be distributed to numerous theatres with different projection systems and/or configurations, then a more appropriate or larger sample size should be collected, e.g., by returning (repeatedly as needed) to measurement step 504 for additional measurements in other theatres or display venues.

Once a sufficient number of measurements have been collected for one or more projection systems and/or theatres, the measured results are consolidated in step 506, for example, by computing a mean or average value using suitable techniques, which can include arithmetic or geometric mean, or least squares mean, among others.

If one or more projection systems have much more severe keystoning or other distortions than most of the others systems, then the averaging approach may result in a distortion that is significantly skewed, or inappropriate for other systems. In this situation, the outlier(s) should be discarded based on certain criteria, and not be used in calculating the mean distortions.

In step 508, a compensation transform can be established for left- and right-images based on the measurements from step 504, e.g., with the keystone distortion established (measured or averaged values) for the corners of the calibration or test images of a stereoscopic pair. The compensation transform will be used in a subsequent step to transform image data from an original 3D film (i.e., uncorrected for any distortion) to image data that is partially corrected for at least one type of distortion associated with a projection system. Different approaches can be used for establishing the compensation transform, one of which is the use of warp algorithms with associated image warp targets as parameters. For instance, if measurements from step(s) 504 show that the top-left corner ($A_L$) of the left-eye image is too far to the left by three pixels and too high by two pixels, then an image warp target can be set so that a compensation transform moves the top-left corners of all left-eye images down by two pixels and right by three (i.e., with a magnitude about equal to, but in a direction opposite to the measured distortion), and so on for all four corners of each of the left- and right-eye images. Typically, an image warp target is set for each individual measurement point, such as the corners. These four targets, when applied to the respective images, will correct for keystone distortions. That is, each "target" represents an image shift (e.g., in vertical and horizontal steps), or a correction factor or parameter, that can be applied to correct for the corresponding distortion at a specific point of the image. These image warp targets are used as basis for the compensation transform, i.e., transformation function that can be applied to an image to compensate for one or more distortions associated with the projection of the image.

In other words, based on measurements performed at specific points of a test image (e.g., corresponding to corners $A_L$, $A_R$, or edge points of FIG. 2), correction parameters can be derived. The measurements may include corner locations, or a difference in corner locations. Applying these correction parameters to an original film image will result in a distortion-corrected image, which when projected, will have corners appearing at desired target locations. For example, after applying proper corrections for keystone distortions, corners $A_L$ and $A_R$ will both appear at a target location such as the corner A of the viewing area.

Referring to FIG. 2, if the top edge $A_L B_L$ of left-eye test image is curved (as opposed to a straight line), the difference between the expected straight-line height (e.g., distance 231) and the actual height as measured at midpoint $M_t$ along the vertical centerline 201 (e.g., distance 221) can also be included to set a warp target for the middle of the top edge (point $M_t$) to be lowered by a certain amount. Similar correction targets can be established for the middle of each edge of a given image. These targets will correct for pin cushion or barrel distortions.

The compensation transform can be established in step 508 based on the warp targets defined appropriately for any chosen warp algorithm (e.g. Hamburg, op. cit.), or based on distortions determined by computation or estimate in step 507. A warp algorithm takes parameters (e.g., a 2D offset for each corner of a rectangle) and a source image, to produce the warped image. With appropriately selected parameters, the resulting warped image has a built-in compensation for the distortions resulting from the projection geometries. Thus, in one example, the compensation transform (or "image warp") can be a warp algorithm with chose parameters applied to each stereoscopic image pair such as [310, 311], [312, 313], and [314, 315] to produce the corresponding pairs of distortion-compensated images [410, 411], [412, 413], and [414, 415].

Two options are available regarding a compensation transform: one can use a single compensation transform for transforming both left- and right-eye images of a stereoscopic pair, or two separate transforms can be used for transforming respective left- and right-eye images.

When only a single transformation function is used, the transformation or warp function needs to include sufficient parameters to provide corrections to one or both images of a stereoscopic pair. Furthermore, since there is no image in the intra-frame gap, if a single transformation is used to warp both the right- and left-eye images at the same time, the transformation also needs to incorporate any "sign changes" associated with the warp directions for the upper and lower images (e.g., if one image is being warped upwards but the other is being warped downwards). In other words, the corrections to the distortions of the left- and right-eye images are permitted to be discontinuous somewhere within the intra-frame gap 440. Furthermore, if the transformation or correction is provided as a continuous function, there should be suitable isolation so that alterations in the warp for one eye's image would not affect the warp of the other eye (except where symmetry warrants this). This correction is applied consistently throughout the entire film in step 509 (to be further discussed below).

Depending on the specific measurements performed, the compensation transform may include one or more corrections for the different types of distortions (e.g., keystoning, pin cushion or barrel) for which measurements are done. It is not necessary that compensation transform be used to correct all the known or measured distortions. For example, it is possible to correct only one type of distortions, and if further improvement is desired, another compensation transform can be applied to correct for other types of distortion.

Note that the compensation transform may also result in changes to the intra-frame gap in the corrected film. Referring to the example in FIG. 2, in order to compensate for the differential distortion, the bottom-left corner $D_L$ of left-eye image should move down by a distance 232 and the top-left corner $A_R$ of right-eye image should move up by a distance 232* (not necessarily equal to distance 232). Similarly, corner $C_L$ and $B_R$ for the left- and right-images should be moved accordingly. Thus, it is clear that the intra-frame gap 440 of corrected film 400 would be smaller than distance 340 of the original film, because of the reduced distance between the new positions for corners $C_L$, $D_L$ of left-eye image and corners $A_R$, $B_R$ of right-eye image.

In an alternative embodiment, the transformation of left- and right-eye images in step 508 may be conducted separately, i.e., a first transformation used for the left-eye image, and a second transformation used for the right-eye image. In other words, the compensation transform does not have to be a single transform handling both the left- and right-eye pair in the entirety of the frame (as bounded, for example, by aperture plate 120, or as measured by the 4-perf frame spacing).

Although FIG. 5 shows that the compensation transform can be established based on distortions obtained by two different approaches (computed or measured), it is also possible that the distortion values be provided by a combination of both approaches, e.g., one type of distortion arrived at by computation, and another type of distortion being measured.

In step 509, the left- and right-eye images of an original 3D film or movie (uncorrected for distortions) are transformed by applying the compensation transform established in step 508 (e.g., based on the measurements and targets previously obtained). Note that the procedure of applying the compensation transform to stereoscopic images does not mean that an actual original 3D film stock (such as FIG. 3*a*) is physically modified. Rather, the data representing the images are operated upon by the transformation function such that locations of various points of the images are modified to compensate for one or more distortions.

Thus, if a single compensation transform is used to warp both left- and right-eye images of a stereoscopic pair, the data representing images L2 and R2 in the uncorrected film 300 (in FIG. 3*a*) is modified to produce data representing warped images L2 and R2 in a distortion-corrected film 400 of FIG. 4. Alternatively, data for warped images L2 and R2 in film 400 can also be obtained by applying one transformation function on the data of image L2 and another transformation function on the data of image R2 in the uncorrected film 300. The transformed data for the images can be stored in a file, e.g., as digital intermediate, or they can be recorded to film, either as a negative or positive.

In step 510, one or more prints of the film may be made from the film made in step 509. Since the film recording made in step 509 is typically a negative, these prints made in step 510 would be made using typical film print production methods. Alternatively, the film recording made in step 509 may be a film positive, which would be suitable for direct display without printing step 510.

In cases where substantial or noticeable residual keystone or other distortions still exist after the compensation transform, e.g., where measurements or estimates made in steps 507 or 504 are not sufficiently accurate, a successive approximation can be done by testing the print made in step 510. This can be done by returning to step 504 (indicated by the dashed line), where at least one distortion measurement is performed on the film print from step 510 instead of the calibration film from step 503. In this case, additional measurements are obtained for any remaining distortions (usually less than in the previous measurement), and any incremental adjustments that may be needed are incorporated into the original compensation transform of step 508. Alternatively, these additional measurements can be the basis of a subsequent transform which is performed consecutively (e.g., a first transform might correct for keystoning, and a second transform correct for pin cushion distortion).

In optional step 511, the film print is distributed to the same theatre in which measurements were made, or other suitably similar theatres. When properly adjusted, the presentation of the distortion-corrected film print should show reductions in the various types of distortions for which compensation has been applied. The corrected film preferably shows little or no distortions, e.g., for at least one of differential keystoning, pin cushion or barrel distortion.

Process 500 concludes at step 512.

It is previously mentioned that images on the calibration or test film may be the same left- and right-image pairs, e.g., L1 being the same as L2 and L3; and R1 being the same as R2 and R3. However, in another embodiment, images on the calibration film may be provided as an animated sequence, e.g., left-images L1, L2 and L3 in different frames are different from each other, and right-images R1, R2 and R3 are different from each other. The different images in such an animated sequence may be designed, in conjunction with narrative from a sound track, to provide instructions regarding the calibration procedure, and to facilitate the performance of distortion measurements.

Thus, the calibration film may have left- and right-images with different test patterns (e.g., rectangular boundaries with different dimensions or corner locations) such that, when projected, will provide left- and right-images that exhibit different distorted image points due to differential distortions. For example, one image pair may have a larger separation between their top left corners (e.g., $A_R$ and $A_L$ in FIG. 2) due to keystoning, while other image pairs may show smaller separations between these corresponding corners. As the image pairs on the calibration film are projected, the image pair that produces respective corners that overlap each other (or exhibit the smallest separation) may then be recorded, e.g., by an operator or automatically via software. Individual image pairs may be identified by providing a counter or identifying mark on the images of the calibration film. By noting the image pair that produces the smallest differential distortion, corresponding correction parameters for certain distortions may be derived from the relevant dimensions of the pattern in the image pair. Aside from corners, edge points or sides of a pattern may also be used for deriving corresponding correction parameters.

In another embodiment, the images in the calibration film may also be designed such that one set of images, e.g., the right-images, are identical to each other (e.g., a single rectangle), while the left-images are provided as a series of "graduated" rectangles with different dimensions, e.g., different % of the right-image dimensions. The calibration procedure may then involve identifying the left-image that has certain point or element (e.g., corners or edge points, sides, etc.) that intersects or substantially coincides with the corresponding point of the right-image. In this context, identifying the image may be considered performing a measurement. Such a calibration film may be useful in configurations where a certain distortion, e.g., keystoning, affects only one of the stereoscopic images.

One or more features of the present principles may also be applied to synchronized dual film projectors (not shown), where one projector projects the left-eye images and the other projector projects the right-eye images, each through an ordinary projection lens (i.e., not a "combined" version of dual lens such as dual lens 130). In a dual projector, dual lens embodiment, the inter-lens distance d would be substantially greater than a single projector case, since the projection lenses of each projector would be substantially farther apart. In a dual projector system, the projectors can also be provided in a side-by-side configuration, rather than over-and-under, so that the uncorrected keystoning makes the right edge as projected by the leftmost projector larger than the right edge as projected by the rightmost projector, and so on. In this situation, the measurements and targets/corrections described above will be performed accordingly at the appropriate locations (e.g., respective corners and/or edges) relevant to the distortions.

Figure 6:
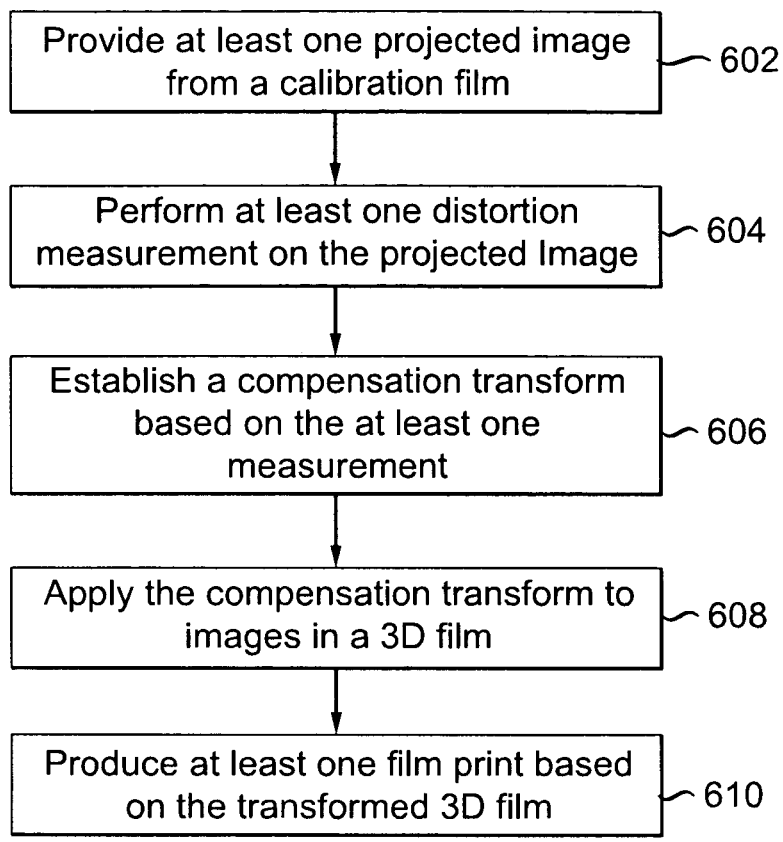
FIG. 6 illustrates another embodiment of a method for producing a distortion-corrected 3D film.

FIG. 6 illustrates another embodiment of a method 600 that can be used for providing corrections or compensations to one or more differential distortions in a dual-lens 3D projection system. Specifically, method 600 can be used for correcting one or more geometric distortion(s) arising from projection systems. The correction(s) are obtained from at least one measurement performed on one or more projected images, as opposed to computational approaches.

In step 602, a calibration film, which resembles an original 3D film (uncorrected for geometric distortions from a projection system) is provided for use in distortion measurements, e.g., by projecting onto a screen. For example, the calibration film has image aspect ratio and size appropriate to the film format of the original 3D film, and includes one or more features discussed above in connection with FIG. 5. In general, projected images from the calibration film include at least one left- and right-eye image pair, e.g., image pair 310 and 311 of FIG. 3. However, it is also possible that only one image for one eye (as opposed to both left- and right-eye images of a stereoscopic pair) needs to be projected for measurement, for example, if the other image (or more accurately, the projection system used for projecting that image) is known to be distortion-free, in which case, the measurement will represent the differential distortion between the two images.

In step 604, at least one measurement is made for at least one type of distortion that may be present from the projection system, e.g., keystoning, pincushion, barrel, and so on. In one example, the measurements include at least one differential distortion measurement (i.e., measuring a difference between the distorted left- and right-eye images). Such measurements are similar to those described above in connection with FIG. 5.

In step 606, a compensation transform is established based on the measurements performed on the image(s) of the calibration film, as previously discussed for FIG. 5.

In step 608, at least one of the two sets of left- and right-eye images (i.e., all left-eye images, all right-eye images, or both) of the original 3D movie is transformed by applying the compensation transform from step 606. The compensation transformation is applied to each left- and right-eye image pair consistently throughout the original 3D movie. In other words, all left-eye images will receive the same transformation as each other, and all right-eye images will receive the same transformation as each other. Note that even if distortion measurements are performed on both stereoscopic images (both having non-zero distortion), it is also possible to apply compensation transform derived from the distortion measurements to only one of the stereoscopic images, e.g., all right-eye images or all left-eye images, for reducing the differential distortion. For example, instead of applying separate transforms or separate image shifts to the respective left- and right-eye images, the compensation transforms can be combined or added into a single transform to be applied to, for example, only the left-eye images. This approach has an advantage of reducing the required computation, e.g., by about a half. The transformed images can be recorded to film, i.e., producing a distortion-corrected version of the 3D film, or stored in a digital file for later use.

In step 610, at least one film print can be made from the distortion-corrected 3D film or from the digital file.

While the above examples focus on distortion correction for film-based 3D projection, one or more features of the present invention can also be applied to certain digital 3D projection systems that use separate lenses or optical components to project the right- and left-eye images of stereoscopic image pairs. Such systems may include single-projector or dual-projector systems, e.g., Christie 3D2P dual-projector system marketed by Christie Digital Systems USA, Inc., of Cypress, Calif., U.S.A., or Sony SRX-R220 4K single-projector system with a dual lens 3D adaptor such as the LKRL-A002, both marketed by Sony Electronics, Inc. of San Diego, Calif., U.S.A. In the single projector system, different physical portions of a common imager are projected onto the screen by separate projection lenses.

For example, a digital projector may incorporate an imager upon which a first region is used for the right-eye images and a second region is used for the left-eye images. In such an embodiment, the display of the stereoscopic pair will suffer the same problems of differential distortions described above for film because of the different optical paths for the respective stereoscopic images.

In such an embodiment, a similar compensation can be applied to the stereoscopic image pair. This compensation can be applied, for example, by one or more processors or a server, to the respective image data either as the data is prepared for distribution, e.g., provided in a file, to a player that will play out to the projector, or by the player itself (or one or more processors in the player) in advance of play-out or in real-time (i.e., compensation being applied to one or more images as other compensated images are being played out), e.g., by real-time computation as the images are transmitted to the projector, by real-time computation in the projector itself, or in real-time in the imaging electronics, or a combination thereof. The computation of compensation or correction in the server or with real-time processing can be performed using substantially the same process as described above for film to produce similar results.

Figure 7:
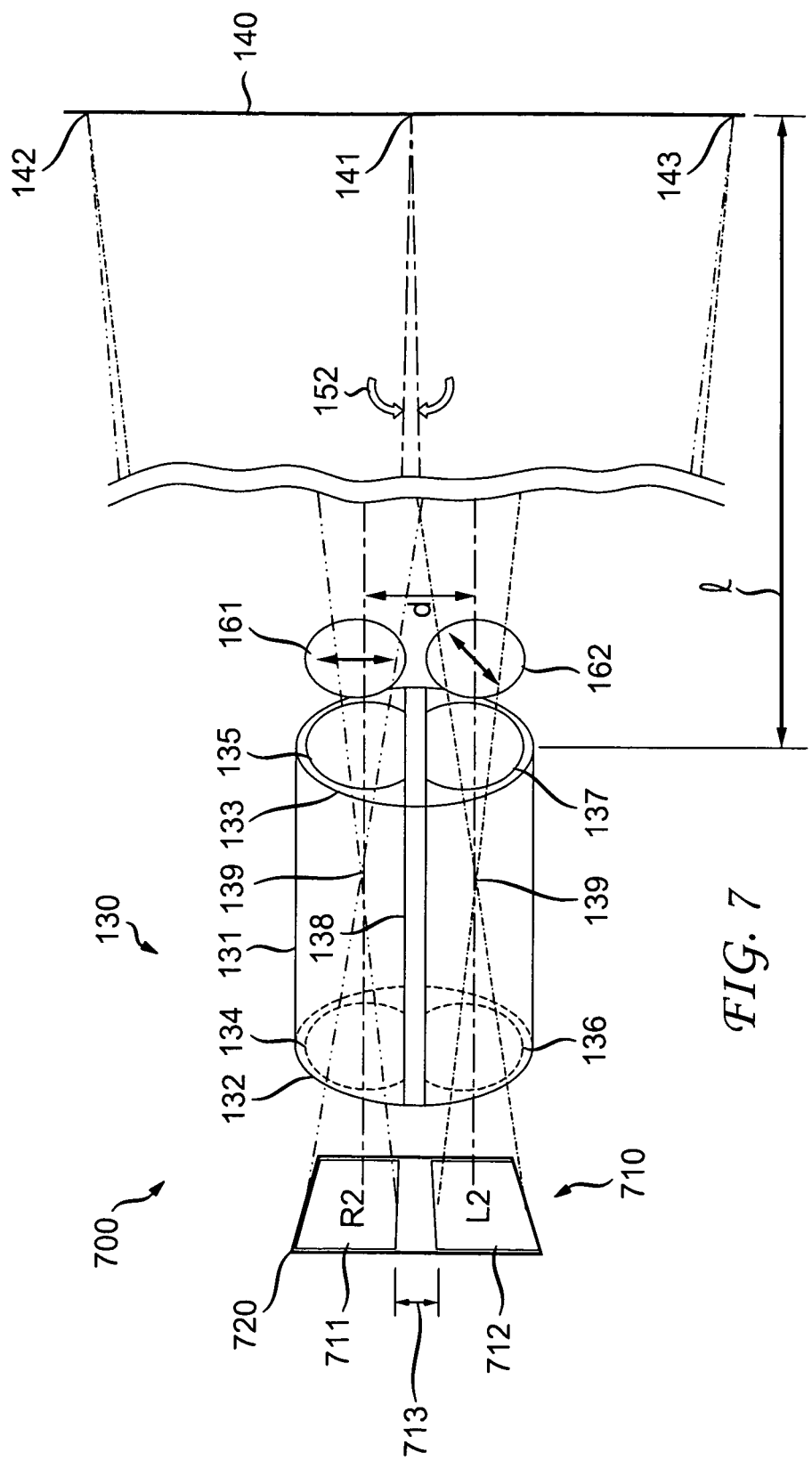
FIG. 7 illustrates a digital projection system.

An example of a digital projector system 700 is shown schematically in FIG. 7, which includes a digital projector 710 and a dual-lens assembly 130 such as that used in the film projector of FIG. 1. In this case, the system 700 is a single imager system, and only one imager 720 is shown (e.g., color wheel and illuminator are omitted). Other systems can have three imagers (one each for the primary colors red, green and blue), and would have combiners that superimpose them optically, which can be considered as having a single three-color imager, or three separate monochrome imagers. In this context, the word "imager" can be used as a general reference to deformable mirrors display (DMD), liquid crystal on silicon (LCOS), light emitting diode (LED) matrix display, scanned laser raster, and so on. In other words, it refers to a unit, component, assembly or sub-system on which the image is formed by electronics for projection. In most cases, the light source or illuminator is separate or different from the imager, but in some cases, the imager can be emissive (include the light source), e.g., LED matrix. Popular imager technologies include micro-mirror arrays, such as those produce by Texas Instruments of Dallas, Tex., and liquid crystal modulators, such as the liquid crystal on silicon (LCOS) imagers produced by Sony Electronics.

The imager 720 creates a dynamically alterable right-eye image 711 and a corresponding left-eye image 712. Similar to the configuration in FIG. 1, the right-eye image 711 is projected by the top portion of the lens assembly 130, and the left-eye image 712 is projected by the bottom portion of the lens assembly 130. A gap 713, which separates images 711 and 712, may be an unused portion of imager 720. The gap 713 may be considerably smaller than the corresponding gap (e.g., intra-frame gap 113 in FIG. 1) in a 3D film, since the imager 720 does not move or translate as a whole (unlike the physical advancement of a film print), but instead, remain stationary (except for tilting in different directions for mirrors in DMD), images 711 and 712 may be more stable.

Also, since the lens or lens system 130 is less likely to be removed from the projector (e.g., as opposed to a film projector when film would be threaded or removed), there can be more precise alignment, including the use of a vane projecting from lens 130 toward imager 720 and coplanar with septum 138.

Note that only one imager 720 is shown here. Some color projectors have only a single imager with a color wheel or other dynamically switchable color filter (not shown) that spins in front of the single imager to allow it to dynamically display more than one color. While a red segment of the color wheel is between the imager and the lens, the imager modulates white light to display the red component of the image content. As the wheel (or color filter) progresses to green, the green component of the image content is displayed by the imager, and so on for each of the RGB primaries (red, green, blue) in the image.

FIG. 7 illustrates an imager that operates in a transmissive mode, i.e., light from an illuminator (not shown) passes through the imager as it would through a film. However, other imagers operate in a reflective mode, i.e., light from the illuminator impinges on the front of the imager and is reflected off of the imager. In some cases (e.g., many micro-mirror arrays), this reflection is off-axis, that is, other than perpendicular to the plane of the imager, and in other cases (e.g., most liquid crystal based imagers), the axis of illumination and reflected light are substantially perpendicular to the plane of the imager.

In most non-transmissive embodiments, additional folding optics, relay lenses, beamsplitters, and so on (known to one skilled in the art, but not shown in FIG. 7, for clarity) are needed to allow imager 720 to receive illumination and for lens 130 to be able to project images 711 and 712 onto screen 140. Digital cinema projectors are more complex, and three imagers (not shown) are used, one for each of the RGB (red, green and blue) primaries.

Figure 8:
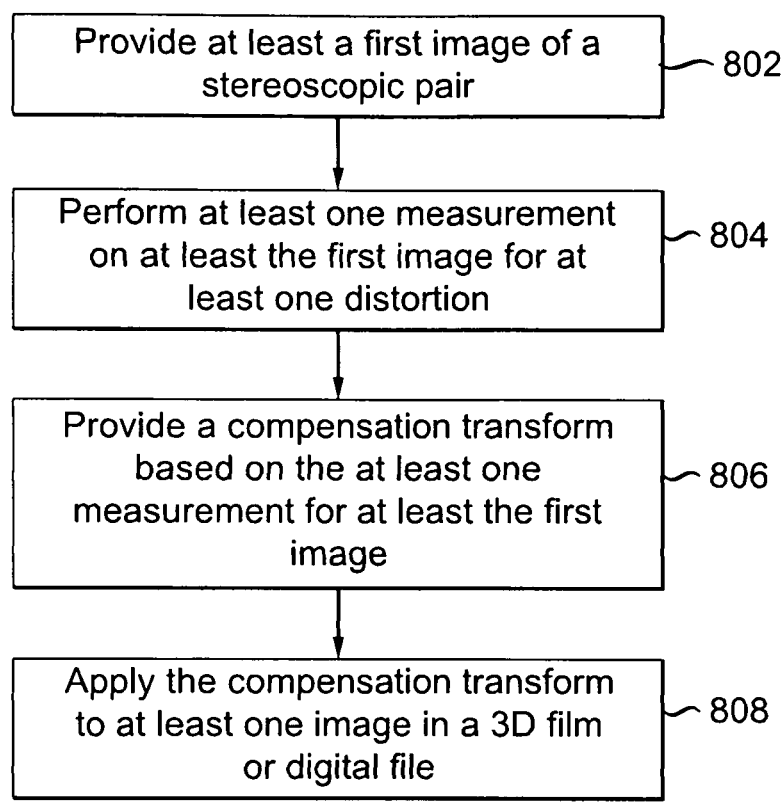
FIG. 8 illustrates another embodiment of a method for producing a distortion-corrected image for 3D projection.

FIG. 8 illustrates an alternative method 800 for correcting differential distortions in 3D projection systems. In step 802, at least a first image of a stereoscopic image pair is projected. The image(s), may be referred to as a test image, can be provided from a film or digital file for use in characterizing a distortion of the projected image. Similar to the example of FIG. 5 or FIG. 6, the film resembles an original 3D film (uncorrected for geometric distortions from a projection system), and has an image aspect ratio and size appropriate to the film format of the original 3D film. The film can be provided as a film loop, and the images in different frames can be the same or different from each other. In the case of the digital file, the image is usually stored in an encoded, compressed form (e.g., JPEG2000) requiring decoding for presentation by the projector (such encoded files and decoding by an image processor, not shown, is well known). A single frame containing the test image can be played out from the digital file for distortion characterization.

In step 804, at least one measurement is performed on at least the projected first image for at least one distortion, e.g., differential distortion. In one embodiment, distortion measurements are performed for both left- and right-eye images projected in step 802. Alternatively, if there is prior knowledge regarding the distortion associated with one of the stereoscopic images (e.g., right-eye image), then a distortion measurement for the other image (e.g., left-eye image) would be sufficient to allow an appropriate compensation for the differential distortion to be determined. Of course, the distortion measurement for the first image has to be made with respect to the known distortion of the second image in order for it to be useful towards compensating for the differential distortion. Such prior knowledge may be obtained from experience, or may be computed based on certain parameters of the projection system, e.g., throw distance, inter-axial distance, among others. However, in the absence of such prior knowledge, projection of both stereoscopic images (left- and right-eye images) for distortion measurements would generally be needed.

In step 806, a compensation transform is established or computed based on the at least one measurement for at least the first projected image.

In step 808, the compensation transform is applied to all frames for at least one image of a stereoscopic pair in an original (not corrected for distortions) 3D film or digital file, such that the resulting or corrected images in the 3D film or digital file have reduced distortions (e.g., differential distortion) compared to the original, uncorrected images. In one example, sufficient compensation or correction is applied such that the resulting stereoscopic images exhibit substantially no differential distortions. Note that if the distortion measurement is performed for a projected right-eye image, a compensation transform derived from the measured distortion can be applied to all right-eye images in the 3D film or digital file. Alternatively, a different compensation transform can also be derived from the measurement for applying to all left-eye images instead. If the measurement is obtained for differential distortion, i.e., the difference between the position of a point or object in the (uncorrected) left- and right-eye images, then the transformation to be applied to all left-eye images will have an opposite direction from that applied to the right-eye images.

In general, the images used for measurements (i.e., in steps 802 and 804) may be the same as or different from those images to which compensation is applied in step 808. Thus, at least one image of a stereoscopic pair (i.e., left- or right-eye image from a test film or digital file) can be used for measurements (in steps 802 and 804), and at least one compensation transform is determined based on these measurements.

The compensation transform can then be applied to all frames of at least one of the images of a stereoscopic pair belonging to a show or program for reducing differential distortion.

Depending on the circumstances, variations to the above method steps are also possible. For example, the image projection step 802 and/or measurement step 804 may be omitted if the amount of differential distortion is already known or otherwise provided. In that scenario, the images can be modified based on the known differential distortion, such that the corrected images can be projected without any substantial differential distortion.

In another scenario, in lieu of projecting images and performing measurements on the images, one can measure the entire projection environment (including projector and theatre), and compute the distortions. Alternatively, if a representative environment has been measured, one can assume that the distortions are similar, and use an estimated differential distortion for another environment.

For example, a crude estimation of differential keystoning might be obtained based on the throw distance l and the inter-axial distance d, and use their ratio to predict the keystoning. The estimate could be improved by adding screen width, and still further by including projector and screen tilts.

In yet another scenario, distortion information can be provided as an initial guess or estimate, e.g., within reasonable range or expectation. A compensation transform can then be applied based on this initial distortion information, and upon examining the results, additional compensation can be applied, if needed, until the distortion has been reduced to a satisfactory level.

Thus, a more general method for correcting for distortions in stereoscopic images can involve providing a transform for compensating for at least a portion of a differential distortion between a first image and a second image of a stereoscopic pair, e.g., with the compensation transform being obtained by various approaches including measurements, computation or estimation, or otherwise provided by others. The compensation transform is then applied to at least the first image for reducing the differential distortion with respect to the second image. For a 3D film or digital file, the same compensation transform is applied to all frames with images corresponding to the same eye.

The above method will result in a distortion compensated 3D film or digital file, which contains two sets of images, e.g., a first set of images for one eye, and a second set of images for the other eye. Each image in the first set, e.g., right eye images, will form a stereoscopic pair with an associated or corresponding image from the second set, e.g., left eye images. At least one of the first set and the second set of images (i.e., any of the first and second sets, or both sets) will incorporate a transformation, i.e., its image data has been transformed from those of an original film or digital file, to at least partially compensate for differential distortion.

Another embodiment of the invention provides a system with at least one processor and associated computer readable medium (e.g., hard drive, removable storage, read-only memory, random accessible memory, and so on). Program instructions are stored in the computer readable medium such that, when executed by one or more processors, will cause a method to be implemented according to one or more embodiments discussed above.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for use in three-dimensional (3D) projection, comprising:
    (a) providing a transform for compensating for at least a portion of a differential distortion between a first image and a second image of a stereoscopic pair for 3D projection using a single dual-lens projector; and
    (b) applying the compensation transform to at least the first image for reducing the differential distortion with respect to the second image.

2. The method of claim 1, wherein the compensation transform is obtained based on distortion information provided by at least one of: measurement, computation and estimation.

3. The method of claim 2, further comprising:
    (c) projecting at least one of the first image and the second image of the stereoscopic pair;
    (d) performing at least one distortion measurement on the at least one projected image; and
    wherein the compensation transform is obtained based on the at least one distortion measurement.

4. The method of claim 3, wherein:
    step (c) further comprises projecting both images of the stereoscopic pair; and
    wherein said at least one distortion measurement comprises measurement of differential distortion between the projected images.

5. The method of claim 3, wherein the differential distortion includes at least differential keystoning distortion associated with a 3D projection system for projecting the first and second images.

6. The method of claim 2, further comprising:
    computing a mean differential distortion based on a plurality of distortion measurements obtained from both images of the stereoscopic pair projected by each of a plurality of projection systems; and
    deriving the compensation transform based on the mean differential distortion.

7. The method of claim 2, wherein the distortion information is provided by computation based on parameters for a 3D projection system for projecting the first and second images.

8. The method of claim 1, wherein the stereoscopic image pair is provided in one of: a film and a digital image file.

9. The method of claim 1, further comprising:
    (e) producing a distortion-corrected 3D film based on at least the transformed image from step (b).

10. The method of claim 1, further comprising:
    (f) creating a digital image file based on at least the transformed image of step (b); and
    (g) playing out the digital image file.

11. The method of claim 1, wherein step (b) further comprises applying the compensation transform to one or more digital images in real-time as the transformed digital images are being played out.

12. The method of claim 1, wherein the dual-lens projector has a single illumination source, a first lens and a second lens for simultaneously projecting the respective first and second images with reduced differential distortion.

13. A system for three-dimensional (3D) projection, comprising:
    a single dual-lens projector; and
    at least one processor configured for:
        (a) providing a transform for compensating for at least a portion of a differential distortion between a first image and a second image of a stereoscopic pair for 3D projection using the single dual-lens projector; and (b) applying the compensation transform to at least the first image for reducing the differential distortion with respect to the second image.

14. The system of claim 13, wherein the compensation transform is obtained based on distortion information provided by at least one of: measurement, computation and estimation.

15. The system of claim 14, further configured for:
   (c) projecting at least one of the first image and the second image of the stereoscopic pair;
   (d) performing at least one distortion measurement on the at least one projected image;
and wherein the compensation transform is obtained based on the at least one distortion measurement.

16. The system of claim 13, further configured for:
   creating a digital image file based on at least the transformed image of step (b); and
   playing out the digital image file.

17. The system of claim 13, further configured for performing step (b) by applying the compensation transform to one or more digital images in real-time as the transformed digital images are being played out.

18. The system of claim 13, wherein the dual-lens projector has a single illumination source, a first lens and a second lens for simultaneously projecting the respective first and second images with reduced differential distortion.

* * * * *